US012466055B2

(12) United States Patent
Wei

(10) Patent No.: US 12,466,055 B2
(45) Date of Patent: Nov. 11, 2025

(54) MULTIFUNCTIONAL SAFETY BOX

(71) Applicant: Kongming Wei, Suzhou (CN)

(72) Inventor: Kongming Wei, Suzhou (CN)

(73) Assignee: NANJING EASTHOUSE ELECTRICAL CO., LTD., Jiangsu (CN)

( * ) Notice: Subject to any disclaimer, the term of this patent is extended or adjusted under 35 U.S.C. 154(b) by 183 days.

(21) Appl. No.: 18/435,847

(22) Filed: Feb. 7, 2024

(65) Prior Publication Data

US 2025/0236010 A1 Jul. 24, 2025

(30) Foreign Application Priority Data

Jan. 18, 2024 (CN) ......................... 202410074572.8

(51) Int. Cl.

*B25H 3/02* (2006.01)
*E05B 47/00* (2006.01)
*B25G 1/10* (2006.01)
*E05B 65/52* (2006.01)

(52) U.S. Cl.

CPC ............ *B25H 3/027* (2013.01); *B25H 3/028* (2013.01); *E05B 47/0001* (2013.01); *B25G 1/10* (2013.01); *E05B 65/52* (2013.01)

(58) Field of Classification Search

CPC ......... B25H 3/027; B25H 3/028; F41C 33/06; E05B 47/00; E05B 65/52; B25G 1/10
USPC ........................................................ 220/4.03
See application file for complete search history.

(56) References Cited

U.S. PATENT DOCUMENTS

| | | | | | | |
|---|---|---|---|---|---|---|
| 3,113,651 | A | * | 12/1963 | Szabo | A45C 13/22 | 16/405 |
| 4,117,914 | A | * | 10/1978 | Snyder | A45C 13/26 | 190/115 |
| 4,638,746 | A | * | 1/1987 | Ishigure | G07D 11/125 | 109/66 |
| 4,782,971 | A | * | 11/1988 | Hill | H01R 13/6397 | 361/726 |
| 4,890,466 | A | * | 1/1990 | Cislo | F41C 33/06 | 109/51 |
| 4,928,800 | A | * | 5/1990 | Green | A45C 13/262 | 190/115 |
| 5,009,088 | A | * | 4/1991 | Cislo | F41C 33/06 | 109/51 |

(Continued)

FOREIGN PATENT DOCUMENTS

| | | | |
|---|---|---|---|
| CN | 210922372 | U | 7/2020 |
| CN | 116360555 | A | 6/2023 |

*Primary Examiner* — Ernesto A Grano
(74) *Attorney, Agent, or Firm* — Ming Jiang; MM IP SERVICES LLC

(57) ABSTRACT

A multifunctional safety box includes an outer box, an inner box, and an electric control assembly. The outer box is provided with a cavity, a box opening, and a handle; a storage chamber is arranged at one end of the inner box, and a cover body is formed at the other end of the inner box; the inner box can be movably inserted in the cavity of the outer box and is provided with a storage groove and a window; the cover body and the box opening can be buckled into a whole and are provided, and a lock is arranged for opening conveniently. According to the disclosure, the multifunctional safety box can be used for safely storing safety appliances such as firearms and knives, and is easy to carry. The appliances can be quickly accessed during use.

12 Claims, 7 Drawing Sheets

(56) References Cited

U.S. PATENT DOCUMENTS

| | | | | | |
|---|---|---|---|---|---|
| 5,595,129 | A * | 1/1997 | Grobe | G07D 11/13 | 109/66 |
| 5,603,559 | A * | 2/1997 | Yemini | B25H 3/06 | 312/334.44 |
| 5,870,910 | A * | 2/1999 | Specht | E05G 1/005 | 248/225.11 |
| 5,890,439 | A * | 4/1999 | McGunn | G07D 11/125 | 109/46 |
| 6,389,645 | B1 * | 5/2002 | Polidoro | B25H 3/02 | 16/444 |
| 6,923,354 | B2 * | 8/2005 | Axelson | B60R 9/00 | 224/547 |
| 7,305,858 | B1 * | 12/2007 | Wu | E05B 73/0005 | 70/164 |
| 7,419,037 | B2 * | 9/2008 | Nordstrom | A45C 13/262 | 280/37 |
| 7,921,683 | B2 * | 4/2011 | Largay, Jr. | E05B 65/52 | 70/164 |
| 8,020,416 | B2 * | 9/2011 | Talmage | E05G 1/00 | 109/59 R |
| 8,186,188 | B1 * | 5/2012 | Brown | E05G 1/005 | 109/45 |
| 8,408,147 | B2 * | 4/2013 | Holloway | E05G 1/06 | 70/85 |
| 8,783,552 | B2 * | 7/2014 | Xu | G07D 11/25 | 232/15 |
| D752,314 | S * | 3/2016 | Nachtman | D99/28 | |
| D759,340 | S * | 6/2016 | Nelson | D99/43 | |
| 10,907,399 | B2 * | 2/2021 | Penland | E05G 1/04 | |
| 11,142,926 | B2 * | 10/2021 | Ervin | E05G 1/04 | |
| 2002/0053529 | A1 * | 5/2002 | White | B42F 7/145 | 206/425 |
| 2008/0041756 | A1 * | 2/2008 | Tasman | A47B 87/0284 | 206/508 |
| 2011/0101013 | A1 * | 5/2011 | Berendes | A45C 13/26 | 220/752 |
| 2011/0168729 | A1 * | 7/2011 | Koenig | B65D 25/2858 | 220/768 |
| 2015/0211258 | A1 * | 7/2015 | Gokcebay | E05C 1/04 | 70/278.1 |
| 2018/0020824 | A1 * | 1/2018 | Purifoy | A47B 97/00 | 108/25 |

* cited by examiner

MULTIFUNCTIONAL SAFETY BOX

CROSS-REFERENCE TO RELATED APPLICATIONS

This application claims priority to Chinese Patent Application No. 202410074572.8, filed on Jan. 18, 2024, which is incorporated herein by reference in its entirety.

TECHNICAL FIELD

The disclosure herein relates to the technical field of boxes or cases for storing articles, and more specifically relates to a multifunctional safety box.

BACKGROUND

In daily life, in order to avoid danger or injury, safeguard appliances (firearms, knives, and protective sticks) are generally stored in relatively safe cabinets, and the cabinets must be opened with permission. For example, there are clear specifications and requirements for military and police units and foreign residential households to store the safeguard appliances. Small safeguard appliances (pistols, and knives), etc. also need to be easy to carry and move and used by different people as required. Therefore, the storage cabinets must be easy to carry and easy to use by different people in different places.

However, existing cabinets for storing small safeguard appliances cannot realize easy carrying, and quick accessing, and cannot immediately perform personal protection, deter intruders, and issue rescue calls. Therefore, it is very dangerous for users, In addition, according to the permission administration of the existing cabinets for storing the small safeguard appliances, batteries are used for supplying power to an electric control system, and then an electronic lock can be operated. When danger comes, and if the cabinet is short of power, the battery must be replaced or a mechanical key must be used to open it, the safeguard appliances cannot be quickly accessed within the effective time, which greatly affects timely use and endangers personal safety.

SUMMARY

In order to overcome the above defects, the disclosure provides a multifunctional safety box, which not only stores safeguard appliances, enables to quickly access the appliances, and is easy to carry, but also provides users with self-defense protection and on-site lighting, makes sound for help to deter intruders in a dangerous situation, and can also charge electronic devices in time to protect the user safety to the greatest extent.

In order to solve the technical problems, the technical solutions provided in the disclosure is as follows.

A multifunctional safety box includes: an outer box provided with an upper surface and a lower surface opposite to each other, and at least one side face provided with a cavity inside. A box opening is formed on the side face and communicates with the cavity, and a handle is provided on the upper surface. The multifunctional safety box further includes an inner box. One end of the inner box is a storage chamber corresponding to the cavity of the outer box in size; the inner box is movably inserted into the cavity of the outer box to form a pull-out drawer structure; the storage chamber is provided with a storage groove facing the upper surface of the outer box; a window is provided on a bottom of the storage groove; a cover body is provided at another end of the inner box; when the storage chamber is inserted into the cavity of the outer box completely, the cover body is integrated with the box opening by interlocking to form the multifunctional safety box; when the storage chamber is pulled out from the outer box to a critical position, an inner end of the storage chamber is fixed to an outer end of the outer box, and meanwhile exposing the window to form a shield. The cover body and the outer box are provided with lock assemblies used for locking or unlocking the inner box and the outer box.

As a further improvement of the disclosure, each lock assembly includes a lock bolt arranged on the cover body, a lock pin arranged on the box opening correspondingly, and an electric control assembly arranged on the cover body and used for controlling the lock bolt to move to be engaged with the lock pin for locking or separated from the lock pin for unlocking; the electric control assembly comprises a motor, a main control panel, and a battery assembly. The main control panel is used for controlling the motor to work; the motor is used for driving the lock bolt to move to be engaged with the lock pin for locking or separated from the lock pin for unlocking; and the battery assembly supplies power to the main control panel and the motor.

As a further improvement of the disclosure, the cover body is provided with a mechanical lock that is capable of driving the motor to work with a key, and an electronic lock control assembly that is capable of transmitting information to the main control panel with an electronic password to control the motor to work.

As a further improvement of the disclosure, the cover body is further provided with a lighting apparatus and a loudspeaker device which are connected to the electric control assemblies, respectively; and the electric control assembly is used for controlling the lighting apparatus and the loudspeaker device to work.

As a further improvement of the disclosure, the lighting apparatus is a light arranged on a lower surface of the cover body; the electric control assembly is provided with a light control key used for controlling on-off of the light; the loudspeaker device comprises a loudspeaker provided on the lower surface of the cover body; and the electric control assembly is provided with a loudspeaker control key used for controlling on-off of the loudspeaker.

As a further improvement of the disclosure, the light control key and the loudspeaker control key are arranged on the handle; and the light control key and the loudspeaker control key are connected with the electric control assembly through signal lines.

As a further improvement of the disclosure, a charging socket used for charging the battery assembly of the electric control assembly is arranged in the side face of the cover body.

As a further improvement of the disclosure, the storage chamber is movably inserted into the cavity of the outer box through a sliding connecting piece; when the storage chamber is pulled out from the outer box to the critical position, the inner end of the storage chamber and the outer end of the outer box are fixed through the sliding connecting piece, and meanwhile exposing the window to form a shield.

As a further improvement of the disclosure, the sliding connecting piece comprises a first rail arranged on an inner side face of the outer box, and a second rail arranged on an outer side face of the inner box; a rail groove is formed in a middle of the second rail along an axial direction and used for allowing the first rail to move inside; a rail positioning groove is formed in a inner end position, close to the inner box, of the rail groove; a pair of oppositely-arranged return handles is arranged at an outer end of the first rail; inner ends of the pair of return handles are movably arranged on the first rail through a positioning pin rotating shaft, respectively; a spring is arranged between inner sides of the middle of the pair of return handles so that an elastic force can be kept therebetween; positioning protrusions matched with the rail positioning groove are arranged on an outer side faces of the middle of the pair of return handles, respectively; and when the storage chamber is pulled out from the outer box to the critical position, the positioning protrusion is engaged with the rail positioning groove so that the inner box and the outer box can be fixed.

As a further improvement of the disclosure, the window is of a net structure formed by a steel wire mesh or a transparent window structure made of bulletproof glass; and a bottom face of the outer box and a bottom face of the storage chamber are made of bulletproof materials.

As a further improvement of the disclosure, the storage chamber is movably inserted into the cavity of the outer box through a linear sliding rail; when the storage chamber is pulled out from the outer box to the critical position, the inner end of the storage chamber and the outer end of the outer box are fixed through an engaging assembly, and meanwhile exposing the window to form a shield.

As a further improvement of the disclosure, the engaging assembly comprises a rotary knob, a torsional spring, a clamping pin and a clamping sheet; the rotary knob, the torsional spring and the clamping pin are arranged at positions, close to a box opening, of the upper surface of the outer box, and the clamping sheet is correspondingly arranged on the inner end of the storage chamber; an upper end of the rotary knob can be rotationally arranged on the outer box, and s lower end of the rotary knob stretches into the cavity of the outer box; an inner end of the clamping pin is fixedly connected to the lower end of the rotary knob, and a notch is formed on one side of the outer end of the clamping pin to form a first clamping groove; the rotary knob is sleeved with the torsional spring, and the rotary knob has a torsion for rotating in one direction; the clamping sheet is provided with a second clamping groove allowing the clamping pin to be inserted as a whole; an inner end of the second clamping groove is large and a clamping portion is formed at an opening of the second clamping groove;

When the storage chamber is pulled out from the outer box and is about to reach the critical position, the clamping pin is correspondingly engaged with the second clamping groove on the clamping sheet; and when the storage chamber is pulled out from the outer box and reaches the critical position, the clamping pin enters the inner end of the second clamping groove as a whole and rotates under the action of the torsional spring, thus the first clamping groove of the clamping pin is correspondingly engaged with the clamping portion of the second clamping groove to form an engaging and fixing state.

The disclosure has the beneficial effects that: the multifunctional safety box can be used for safely storing safety appliances such as firearms and knives, and is easy to carry; and when the box is locked, the window with relatively weak anti-violent damage capability is also stored in the box as part of the inner box, thus ensuring safety. The appliances can be quickly accessed during use. At the same time, in a dangerous situation, the user can quickly open the inner box as the shield to protect important parts of the body from infringement. The disclosure also provides the window for the user to observe surrounding environment. The light is also arranged for on-site lighting, and the speaker module can make a sound for help to deter intruders, thus protecting the user safety to the greatest extent. The multifunctional safety box can also charge electronic devices, has multiple functions and is very convenient to use.

DETAILED DESCRIPTION OF THE EMBODIMENTS

Figure 1:
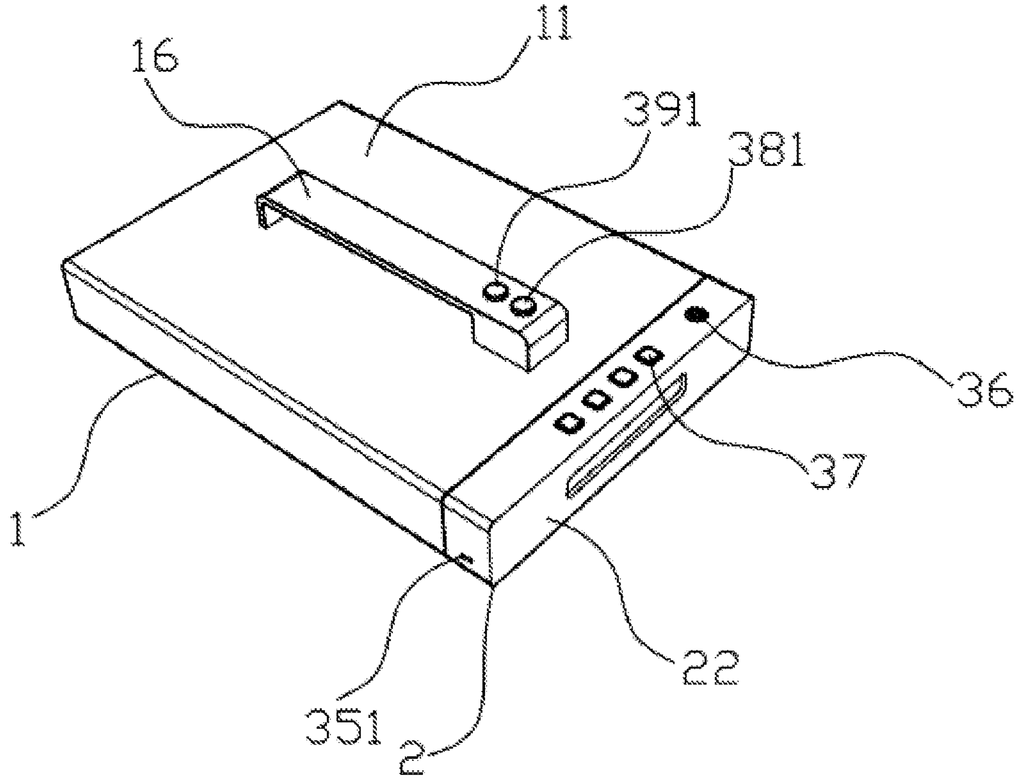
FIG. 1 is a structure schematic diagram of an embodiment of the disclosure.
Figure 2:
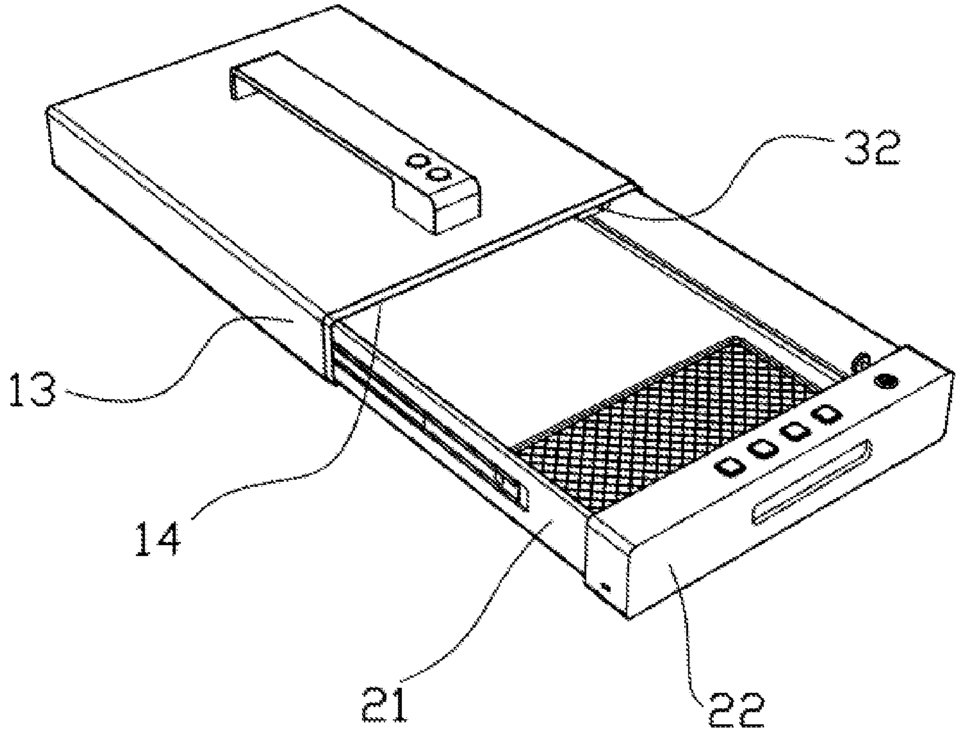
FIG. 2 is a schematic diagram of an opening state of FIG. 1.
Figure 3:
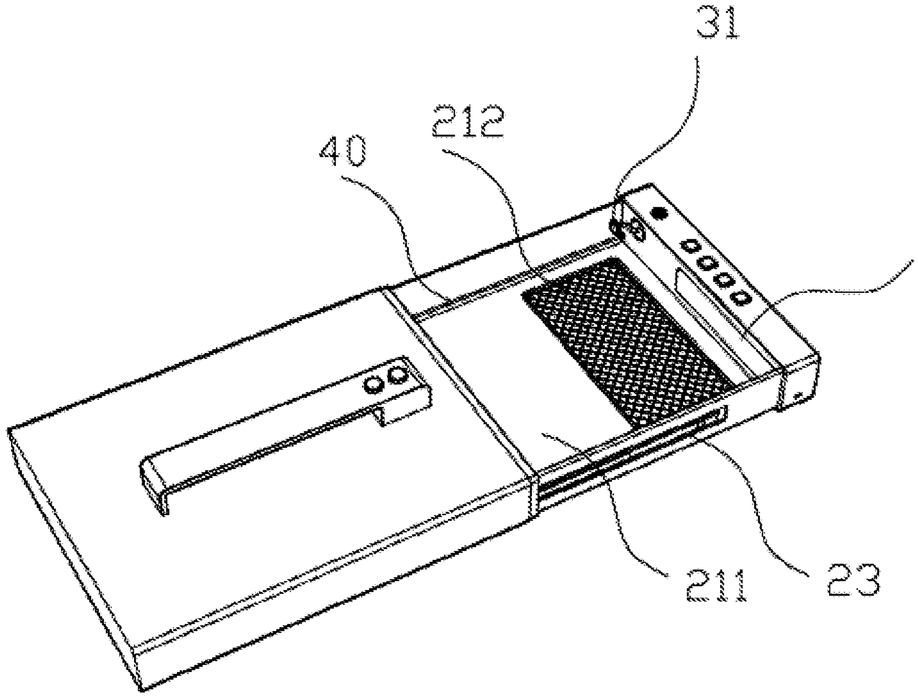
FIG. 3 is a structure schematic diagram of another visual angle of FIG. 2.
Figure 4:
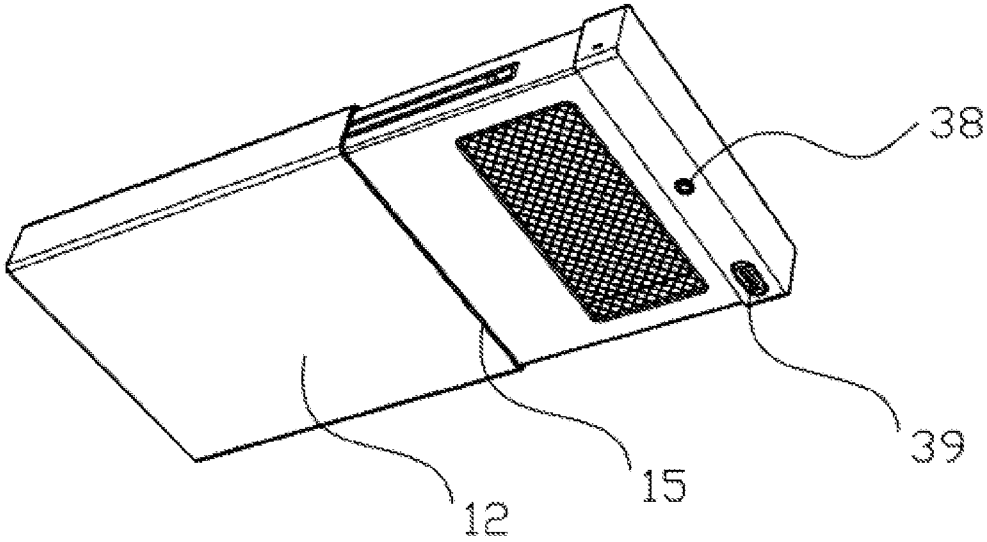
FIG. 4 is a structure schematic diagram of a third visual angle of FIG. 2.

A preferred embodiment of the disclosure will be described in detail below in conjunction with the accompanying drawings.

As shown in FIGS. 1-4, the disclosure provides a multifunctional safety box, including an outer box 1, an inner box 2 and an electric control assembly 3.

The outer box 1 is provided with an upper surface 11 and a lower surface 12 which are opposite, and at least one side face 13. In this embodiment, a hexahedron is taken as an example, that is, the outer box 1 is of a hexahedron structure and is provided with four opposite side faces in 13, and a box opening 15 is formed in one side face 13 and communicates with a cavity 14 formed in the outer box 1; therefore, a part of the inner box 2 can be movably inserted in the cavity 14 of the outer box 1 through the box opening, and the inner box 2 and the outer box 1 form a drawer-shaped structure; and the inner box 2 can be pulled out or inserted in the cavity 14 of the outer box 1 as required.

Definitely, the outer box may be in other shapes such as an oval or circular structure, and may form at least a flat structure. A handle 16 is arranged on the upper surface 11 of the outer box 1, and therefore the box can be conveniently carried or taken and placed.

One end of the inner box 2 is provided with a storage chamber 21 corresponding to the cavity 14 of the outer box 1 in size, and the other end of the inner box is provided with a cover body 22. The storage chamber 21 is movably inserted in the cavity 14 of the outer box 1 through a sliding connecting piece 23, so as to form the abovementioned drawer-shaped structure. In this embodiment, the cavity 14 is of a square structure, the storage chamber 21 is also of a square structure, and the square structures are more beneficial to processing and arrangement of a larger storage space.

When the storage chamber 21 is completely inserted into the cavity 14 of the outer box 1, the cover body 22 and the box opening 15 are buckled into a whole, thus forming the multifunctional safety box. When pulling out the storage chamber 21 from the outer box 1 to the critical position, the inner end of the storage chamber 21 and the outer end of the outer box are fixed through the sliding connecting piece 23, and a window 212 is exposed at the same time to form a shield.

Figure 5:
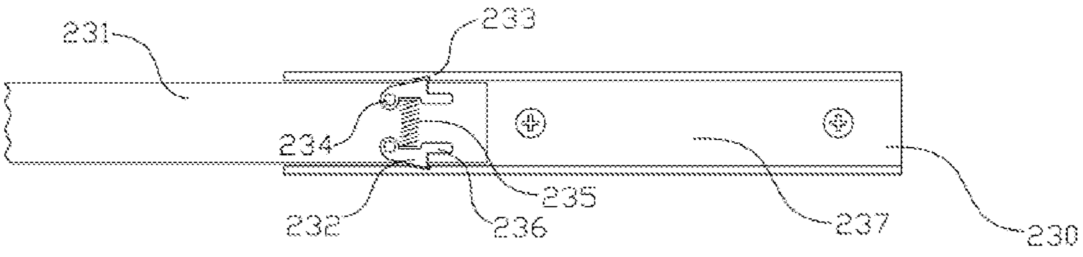
FIG. 5 is a structure schematic diagram of a sliding connecting piece according to an embodiment of the disclosure.

The sliding connecting piece 23 between the storage chamber 21 and the outer box 1 forms the abovementioned structure similar to the drawer, and the structure of a positioning sliding rail or other guide rails and sliding blocks, or other movable structures capable of achieving relative stretching can be adopted. In this embodiment, as shown in FIG. 5, the sliding connecting piece 23 includes a first rail 231 arranged on the inner side face of the outer box, and a second rail 230 arranged on the outer side face of the inner box; a rail groove 237 is formed in the middle of the second rail 230 in the axial direction and used for allowing the first rail 231 to move inside; a rail positioning groove 233 is formed in a position, close to the inner end of the inner box, of the rail groove 237; a pair of oppositely-arranged return handles 236 is arranged at the outer end of the first rail 231; the inner ends of the pair of return handles 236 are movably arranged on the first rail 231 through positioning pin rotating shafts 234; a spring 235 is arranged between the inner sides of the middles of the pair of return handles 236 so that an elastic force can be kept therebetween; positioning protrusions matched with the rail positioning groove 233 are arranged on the outer side faces of the middles of the pair of return handles 236; and when pulling out the storage chamber 21 from the outer box 1 to the critical position, the positioning protrusions are engaged with the rail positioning groove 233 so that the inner box and the outer box can be fixed. During use, the inner box 2 is pulled, and then the second rail 230 is driven to slide relative to the first rail 231; when the inner end of the inner box 2 is pulled out and close to the box opening 15 of the outer box, the positioning protrusions on the pair of return handles 236 are just engaged with the rail positioning groove 233 in the inner end of the second rail 230, and therefore the positions of the inner box and the outer box are limited, and the abovementioned shield structure is formed. Definitely, there are multiple structural pieces capable of achieving the sliding connecting piece function, such as positioning rail, and the disclosure does not specifically limit the structures, as long as sliding connection and positioning between the inner box and the outer box are achieved.

As mentioned above, the storage chamber 21 may also be movably inserted into the cavity 14 of the outer box 1 through a linear sliding rail; and when pulling out the storage chamber 21 from the outer box 1 to the critical position, the inner end of the storage chamber 21 and the outer end of the outer box can be fixed by arranging an engaging assembly, and meanwhile the window 212 is exposed to form the shield.

Figure 6A:
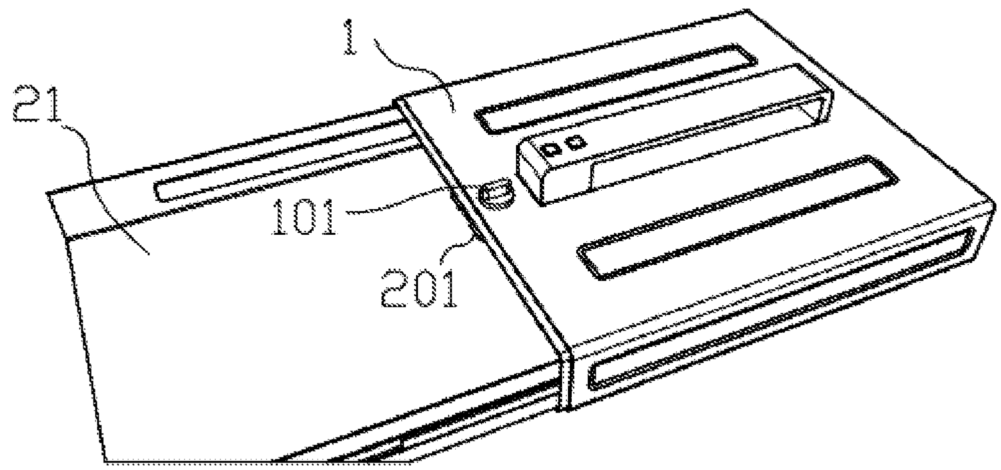
FIG. 6A is a structure schematic diagram of an engaging assembly according to an embodiment of the disclosure.
Figure 6B:
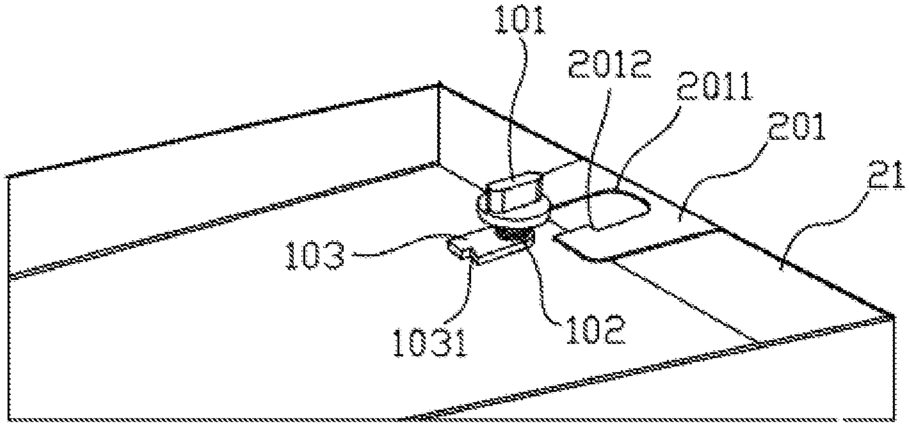
FIG. 6B is a schematic diagram of an internal structure of an engaging assembly according to an embodiment of the disclosure.

As shown in FIG. 6A and FIG. 6B, the engaging assembly includes a rotary knob 101, a torsional spring 102, a clamping pin 103 and a clamping sheet 201; the rotary knob, the torsional spring and the clamping pin are arranged at positions, close to the box opening 11, of the upper surface of the outer box 1, and the clamping sheet is correspondingly arranged on the inner end of the storage chamber 21; the upper end of the rotary knob 101 can be rotationally arranged on the outer box 1, and the lower end of the rotary knob 101 stretches into the cavity of the outer box 1; the inner end of the clamping pin 103 is fixedly connected to the lower end of the rotary knob 101, and a notch is formed in one side of the outer end of the clamping pin to form a first clamping groove 1031; the rotary knob 101 is sleeved with the torsional spring 102, and the rotary knob 101 has a torsion for rotating in one direction; and the clamping sheet 201 is provided with a second clamping groove 2011 allowing the clamping pin 103 to be integrally inserted, the inner end of the second clamping groove 2011 is large, and a clamping portion 2012 is formed at an outlet of the second clamping groove.

The working principle is as follows.

When the outer box and the inner box are in a locking state, the clamping pin 103 is in a free state through torsion of the torsional spring 102.

Figure 6C:
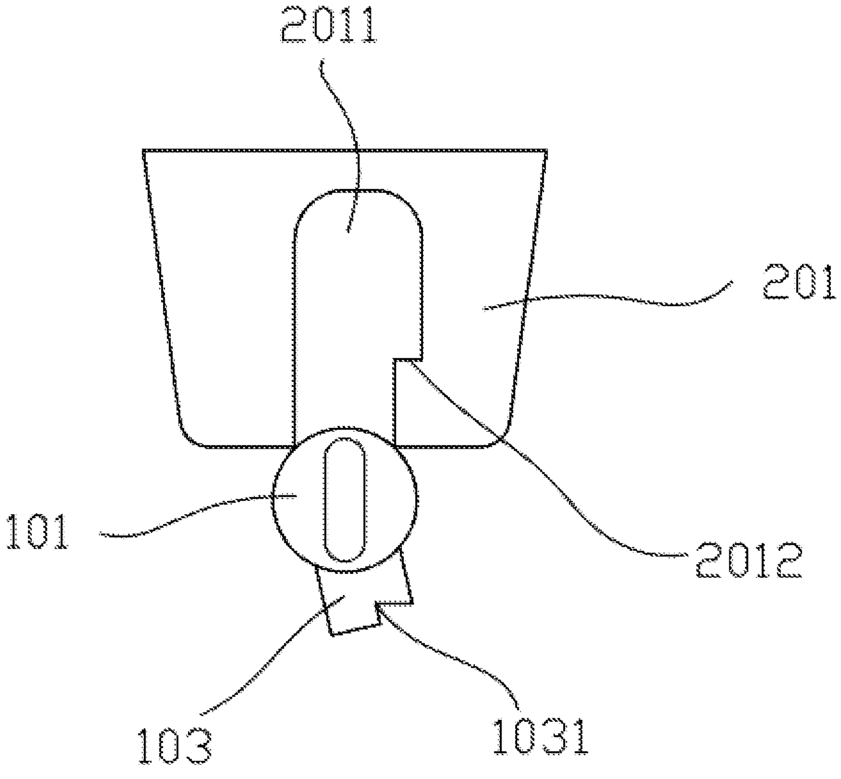
FIG. 6C is a schematic diagram of a state of an engaging assembly before clamping according to an embodiment of the disclosure.
Figure 6D:
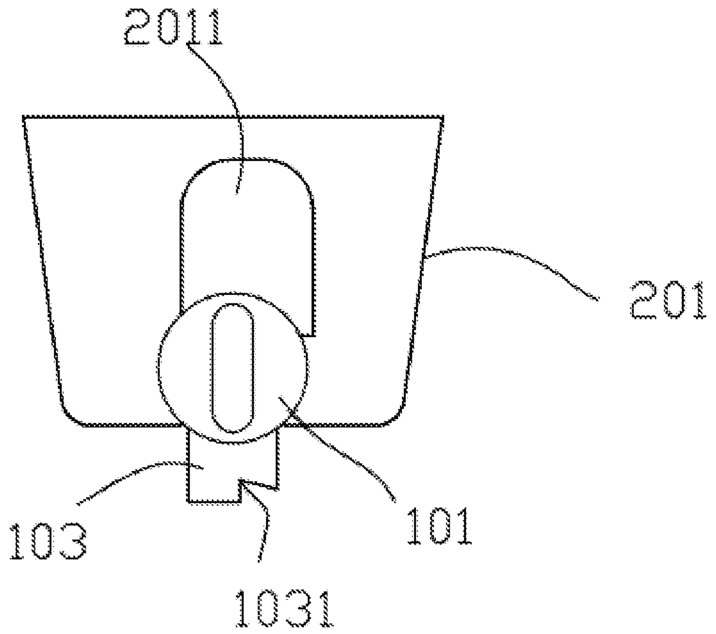
FIG. 6D is a schematic diagram of a clamping process of an engaging assembly according to an embodiment of the disclosure.
Figure 6E:
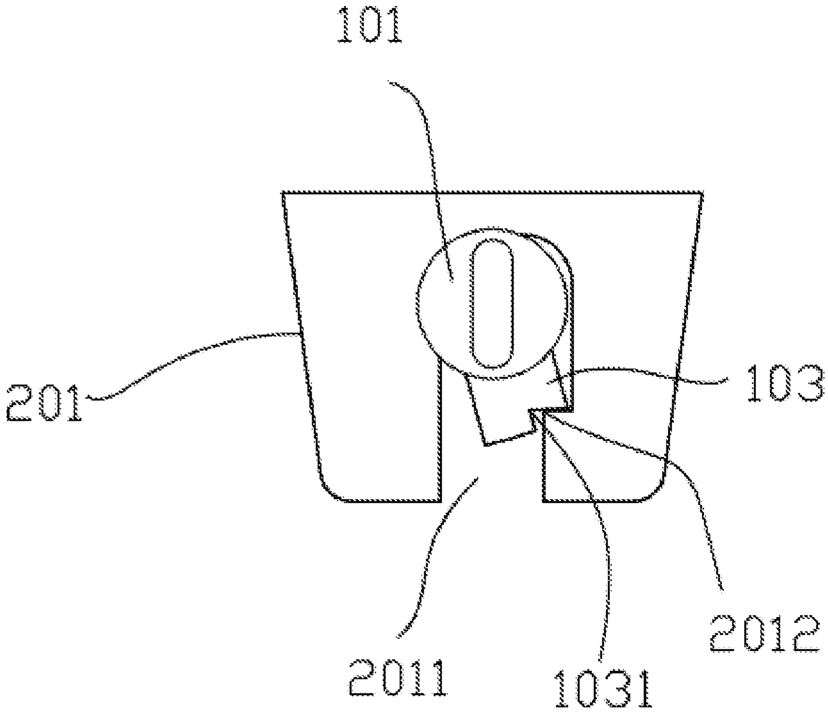
FIG. 6E is a schematic diagram of clamping of an engaging assembly according to an embodiment of the disclosure.
Figure 6F:
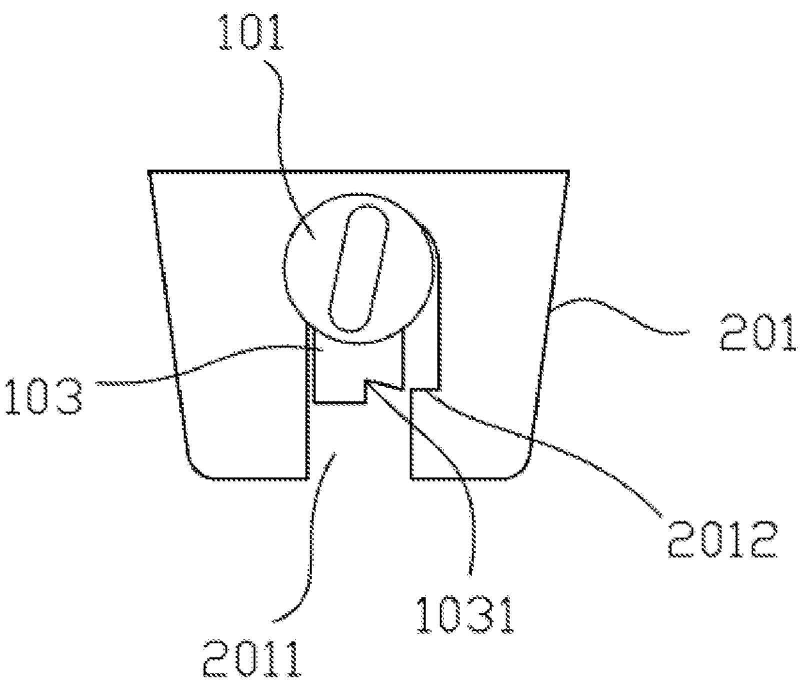
FIG. 6F is a schematic diagram of clamping releasing of an engaging assembly according to an embodiment of the disclosure.

When the storage chamber 21 is pulled out form the outer box 1 and is about to reach the critical position, the clamping pin 103 firstly correspondingly reaches an opening of the second clamping groove 2011 in the clamping sheet 201 as shown in FIG. 6C; when the storage chamber 21 is continuously pulled out form the outer box 1, the clamping pin 103 correspondingly enters the second clamping groove 2011 in the clamping sheet 201 as shown in FIG. 6D; and when the storage chamber is continuously pulled out to reach a critical value, the clamping pin 103 completely enters the innermost end of the second clamping groove 2011 in the clamping sheet 201, and at the moment, the space of the innermost end of the second clamping groove is large, thus the clamping pin 103 can rotate with the torsion of the torsional spring 102 until the first clamping groove 1031 of the clamping pin 103 is correspondingly engaged with the clamping portion 2012 of the second clamping groove 2011 to form a clamping fixed state, as shown in FIG. 6E.

When the danger is solved, or the inner box and the outer box need to be locked for other purposes, the rotary knob 101 is rotated to drive the clamping pin 103 to rotate and release the clamping relation of the first clamping groove 1031 to the clamping portion 2012 of the second clamping groove 2011; and then the inner box is pushed inwards, and the clamping pin 103 is gradually separated from the second clamping groove 2011 of the clamping sheet 201 so that the clamping relation is released.

In addition, the inner box 2 is provided with a storage groove 211 facing the upper surface 11 of the outer box 1, and the storage groove is used for storing guns or other valuables. The window 212 is formed in the bottom of the storage groove 211; and the window 212 has a net-shaped structure made of a steel wire mesh, or a transparent window structure made into a model with bulletproof arrangement punched holes at the same position or made of bulletproof glass, or is made of other visual protection materials.

The window 212 is positioned outside the inner box when the inner box 2 is pulled out form the outer box. When the inner box is pulled out form the outer box to form the shield structure and the user holds the handle to put the multifunctional safety box according to the disclosure in front, the user can observe external dangerous situation from the window and then respond and make a decision in time. In order to further improve the safety performance, the bottom face of the outer box and the bottom face of the storage chamber are made of bulletproof materials such as steel plates, ceramic composites, and ultra-high molecular weight polyethylene.

In this embodiment, the cover body 22 is also of a square structure, and the length and height of one side of the cover body are consistent with those of the outer box 1, so when the storage chamber 21 is completely inserted into the cavity 14 of the outer box 1, the cover body 22 is just buckled with the box opening 15 to form an integrated square structure, thus forming the hexahedral multifunctional safety box.

In order to improve the safety function of the multifunctional safety box, lock assemblies used for locking or unlocking are arranged between the cover body 22 and the outer box 1 and may be in a conventional lock bolt, lock pin and mechanical lock mode, or in other electronic lock modes with electronic passwords or human face unlocking type smart unlocking systems, which are not specifically limited in the disclosure.

In this embodiment, each lock assembly includes a lock bolt 31 arranged on the cover body 22, a lock pin 32 correspondingly arranged on the box opening 15, and an electric control assembly 3 arranged on the cover body 22 and used for controlling the lock bolt 31 to move so as to be engaged with the lock pin 32 for locking or separated from the lock pin 32 for unlocking.

Figure 7:
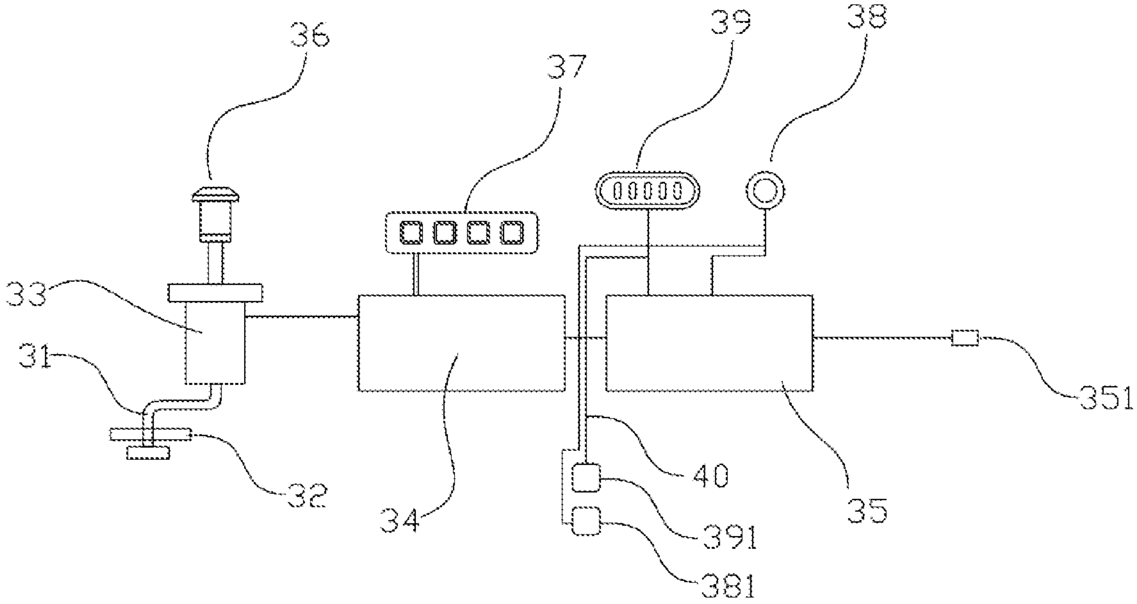
FIG. 7 is a principle schematic diagram of an electric control component according to an embodiment of the disclosure.

As shown in FIG. 7, in this embodiment, the electric control assembly 3 includes a motor 33, a main control panel 34, and a battery assembly 35; the main control panel 34 is used for controlling the motor 33 to work; the motor 33 is used for driving the lock bolt 31 to move so as to be engaged with the lock pin 32 for locking or separated from the lock pin 32 for unlocking; and the battery assembly 35 supplies power to the main control panel 34 and the motor 33. The cover body 22 is provided with a mechanical lock 36 that can drive the motor 33 to work with a key, and electronic lock control assemblies 37 that can transmit information to the main control panel 34 with an electronic password so as to control the motor 33 to work. Thus, the lock assemblies according to the disclosure may be opened through the mechanical lock 36, and may also be opened through other electronic intelligent manners, such as the electronic password, face recognition, and fingerprint recognition, formed by the electronic lock control assemblies 37, which facilitates the user.

In this embodiment, the cover body 22 is also provided with a lighting apparatus and a loudspeaker device module which are respectively connected to the electric control assembly 3, and the electric control assembly 3 is used for controlling the lighting apparatus and the loudspeaker device module to work. Further, in this embodiment, the lighting apparatus is a light 38 arranged on the lower surface of the cover body 22, and the electric control assembly 3 is provided with a light control key 381 for controlling the on-off of the light; and the loudspeaker device module includes a loudspeaker device 39 arranged on the lower surface of the cover body 22, and the electric control assembly 3 is provided with a loudspeaker control key 391 for controlling the on-off of the loudspeaker device 39. The light 38 is controlled to be on and off by the light control key 381, and the loudspeaker device 39 is controlled to be on and off by the loudspeaker control key 391.

In order to turn on the light 33 and the loudspeaker device module more conveniently during use, the light control key 381 and the loudspeaker control key 391 are arranged on the handle 16, and the light control key 381 and the loudspeaker control key 391 are connected with the electric control assembly 3 through signal lines 36.

Moreover, a charging socket 351 for charging a battery assembly of the electric control assembly 3 is formed in the side face of the cover body 22, so that the electric control assembly can be charged at ordinary times.

The connection and control relation principle of the abovementioned electric control components is shown in FIG. 7. The electric control components mainly include the main control board 34, the motor 33, the battery assembly 35 and the like; the motor 33 is used for controlling the lock bolt 31 and the lock pin 32 to be clamped for locking and separated for unlocking; the motor 33 may be controlled to work through the mechanical lock 36, and may also be controlled by the main control board 34, namely by setting key password or fingerprint password through the electronic lock control assemblies 37. The battery assembly 35 is used for supplying power to the main control board and other electronic devices, and is charged through the charging socket 351 to replenish electricity. The light 38 and the loudspeaker device 39 are controlled to be turned on or off through the corresponding light control key 381 and loudspeaker control key 391 respectively, so that smart control is realized.

According to the disclosure, the multifunctional safety box has a safe storage function in a normal state, and the mechanical lock can be opened through the key or an electronic lock button switch 37 of the electronic control assembly 3 to unlock the inner box 2 and the outer box 1. After unlocking, the inner box 2 can be pulled out form the cavity 14 of the outer box 1, then a pistol or other valuables can be placed in the storage groove 211 formed in the storage chamber 21 of the inner box 2, the inner box 2 is pushed into the outer box 1 after the pistol or other valuables are placed, and then the mechanical lock is used for locking, thus realizing the storage of the valuables.

In emergency such as invasion, the user can quickly open the inner box 2 with the electronic lock button switch 37, pull out the inner box 2, take out the built-in weapon for safeguard, and synchronously grasp the handle 16 to hold the box as a protective shield (the inner box and the outer box form the protective shield) so as to protect important parts of the body from being injured. Meanwhile, the user can observe surrounding dangerous situations with the window 212, which facilitates responding and decision-making. In addition, the light 33 and the loudspeaker device module can be quickly turned on through the light control key 331 and the loudspeaker control key 341 which are arranged on the handle 16, the light 33 emits strong light to illuminate or interfere with the dangerous situation, and the loudspeaker device module gives out an alarm sound or a rescue sound through the loudspeaker device 39 to frighten the intruder or give an alarm.

Therefore, the multifunctional safety box according to the disclosure can be used for safely storing safety appliances such as firearms and knives, and is easy to carry. The appliances can be quickly accessed during use. At the same time, in a dangerous situation, the user can quickly open the inner box as the shield to protect important parts of the body from infringement. The disclosure also provides the window for the user to observe the surrounding environment. The light is also arranged for on-site lighting, and the speaker module can make a sound for help to deter intruders, thus protecting the personal safety to the greatest extent. The multifunctional safety box can also charge electronic devices, has multiple functions, and is very convenient to use.

In the above description, numerous specific details are set forth in order to provide a thorough understanding of the disclosure. However, the above description is only a preferred embodiment of the disclosure. The disclosure can be implemented in many other ways different from those described here, so the disclosure is not limited to the specific implementation disclosed above. At the same time, any person skilled in the art can make many possible changes and modifications to the technical solution of the disclosure by using the methods and technical content disclosed above, or modify it into equivalent implementations with equivalent changes, without departing from the scope of the technical solution of the disclosure. Any simple modifications, equivalent changes, and modifications made to the above embodiments based on the technical essence of the disclosure without departing from the content of the technical solution of the disclosure still fall within the protection scope of the technical solution of the disclosure.

What is claimed is:

1. A multifunctional safety box, comprising:

an outer box provided with an upper surface and a lower surface opposite to each other, and at least one side face provided with a cavity inside; wherein a box opening is formed on the side face and communicates with the cavity, and a handle is provided on the upper surface; and an inner box; wherein one end of the inner box is a storage chamber corresponding to the cavity of the outer box in size; the inner box is movably inserted into the cavity of the outer box to form a pull-out drawer structure; the storage chamber is provided with a storage groove facing the upper surface of the outer box; a window is provided on a bottom of the storage groove; a cover body is provided at another end of the inner box; when the storage chamber is inserted into the cavity of the outer box completely, the cover body is integrated with the box opening by interlocking to form the multifunctional safety box; when the storage chamber is pulled out from the outer box to a critical position, an inner end of the storage chamber is fixed to an outer end of the outer box, and meanwhile exposing the window to form a shield, wherein the cover body and the outer box are provided with lock assemblies used for locking or unlocking the inner box and the outer box.

2. The multifunctional safety box according to claim 1, wherein the lock assembly comprises a lock bolt arranged on the cover body, a lock pin arranged on the box opening correspondingly, and an electric control assembly arranged on the cover body and used for controlling the lock bolt to move to be engaged with the lock pin for locking or separated from the lock pin for unlocking; and the electric control assembly comprises a motor, a main control panel, and a battery assembly; the main control panel is used for controlling the motor to work; the motor is used for driving the lock bolt to move to be engaged with the lock pin for locking or separated from the lock pin for unlocking; and the battery assembly supplies power to the main control panel and the motor.

3. The multifunctional safety box according to claim 2, wherein the cover body is provided with a mechanical lock that is capable of driving the motor to work with a key, and an electronic lock control assembly that is capable of transmitting information to the main control panel with an electronic password to control the motor to work.

4. The multifunctional safety box according to claim 3, wherein the cover body is further provided with a lighting apparatus and a loudspeaker device, the lighting apparatus and the loudspeaker device are connected to the electric control assemblies, respectively; and the electric control assembly is used for controlling the lighting apparatus and the loudspeaker device to work.

5. The multifunctional safety box according to claim 4, wherein the lighting apparatus is a light arranged on a lower surface of the cover body; the electric control assembly is provided with a light control key used for controlling on-off of the light; the loudspeaker device comprises a loudspeaker provided on the lower surface of the cover body; and the electric control assembly is provided with a loudspeaker control key used for controlling on-off of the loudspeaker.

6. The multifunctional safety box according to claim 5, wherein the light control key and the loudspeaker control key are arranged on the handle; and the light control key and the loudspeaker control key are connected with the electric control assembly through signal lines.

7. The multifunctional safety box according to claim 2, wherein a charging socket used for charging the battery assembly of the electric control assembly is arranged in the side face of the cover body.

8. The multifunctional safety box according to claim 1, wherein the storage chamber is movably inserted into the cavity of the outer box through a sliding connecting piece; when the storage chamber is pulled out from the outer box to the critical position, the inner end of the storage chamber and the outer end of the outer box are fixed through the sliding connecting piece, and meanwhile exposing the window to form a shield.

9. The multifunctional safety box according to claim 8, wherein the sliding connecting piece comprises a first rail arranged on an inner side face of the outer box, and a second rail arranged on an outer side face of the inner box; a rail groove is formed in a middle of the second rail along an axial direction and used for allowing the first rail to move inside; a rail positioning groove is formed in an inner end position, close to the inner box, of the rail groove; a pair of oppositely-arranged return handles is arranged at an outer end of the first rail; inner ends of the pair of return handles are movably arranged on the first rail through a positioning pin rotating shaft, respectively; a spring is arranged between inner sides of the middle of the pair of return handles so that an elastic force can be kept therebetween; positioning protrusions matched with the rail positioning groove are arranged on an outer side faces of the middle of the pair of return handles, respectively; and when the storage chamber is pulled out from the outer box to the critical position, the positioning protrusion is engaged with the rail positioning groove so that the inner box and the outer box can be fixed.

10. The multifunctional safety box according to claim 1, wherein the window is of a net structure formed by a steel wire mesh or a transparent window structure made of bulletproof glass; and a bottom face of the outer box and a bottom face of the storage chamber are made of bulletproof materials.

11. The multifunctional safety box according to claim 1, wherein the storage chamber is movably inserted into the cavity of the outer box through a linear sliding rail; when the storage chamber is pulled out from the outer box to the critical position, the inner end of the storage chamber and the outer end of the outer box are fixed through an engaging assembly, and meanwhile exposing the window to form a shield.

12. The multifunctional safety box according to claim 11, wherein the engaging assembly comprises a rotary knob, a torsional spring, a clamping pin and a clamping sheet; the rotary knob, the torsional spring and the clamping pin are arranged at positions, close to a box opening, of the upper surface of the outer box, and the clamping sheet is correspondingly arranged on the inner end of the storage chamber; an upper end of the rotary knob can be rotationally arranged on the outer box, and a lower end of the rotary knob stretches into the cavity of the outer box; an inner end of the clamping pin is fixedly connected to the lower end of the rotary knob, and a notch is formed on one side of the outer end of the clamping pin to form a first clamping groove; the rotary knob is sleeved with the torsional spring, and the rotary knob has a torsion for rotating in one direction; the clamping sheet is provided with a second clamping groove allowing the clamping pin to be inserted as a whole; an inner end of the second clamping groove is large and a clamping portion is formed at an opening of the second clamping groove;

when the storage chamber is pulled out from the outer box and is about to reach the critical position, the clamping pin is correspondingly engaged with the second clamping groove on the clamping sheet; and when the storage chamber is pulled out from the outer box and reaches the critical position, the clamping pin enters the inner end of the second clamping groove as a whole and rotates under the action of the torsional spring, thus the first clamping groove of the clamping pin is correspondingly engaged with the clamping portion of the second clamping groove to form an engaging and fixing state.

* * * * *